(12) United States Patent
Taniguchi et al.

(10) Patent No.: US 8,542,129 B2
(45) Date of Patent: Sep. 24, 2013

(54) PARKING AID SYSTEM

(75) Inventors: Daisuke Taniguchi, Chiryu (JP);
Ryusuke Kawano, Obu (JP)

(73) Assignee: DENSO CORPORATION, Kariya (JP)

( * ) Notice: Subject to any disclaimer, the term of this patent is extended or adjusted under 35 U.S.C. 154(b) by 611 days.

(21) Appl. No.: 12/801,431

(22) Filed: Jun. 8, 2010

(65) Prior Publication Data

US 2011/0006917 A1 Jan. 13, 2011

(30) Foreign Application Priority Data

Jun. 9, 2009 (JP) ................. 2009-138493

(51) Int. Cl.
*B60Q 1/48* (2006.01)
*H04N 7/00* (2011.01)

(52) U.S. Cl.
USPC ......... 340/932.2; 340/937; 348/118; 348/119

(58) Field of Classification Search
USPC ...... 340/932.2, 937, 933, 942, 943; 702/150; 348/118, 119, 148, 113; 280/761; 180/199; 701/1, 41
See application file for complete search history.

(56) References Cited

U.S. PATENT DOCUMENTS

| 6,292,110 B1* | 9/2001 | Budnovitch | 340/932.2 |
| 2006/0255969 A1* | 11/2006 | Sakakibara | 340/932.2 |
| 2007/0146165 A1* | 6/2007 | Tanaka | 340/932.2 |
| 2009/0303080 A1* | 12/2009 | Kadowaki et al. | 340/932.2 |

FOREIGN PATENT DOCUMENTS

| JP | A-2001-106115 | 4/2001 |
| JP | A-2001-199297 | 7/2001 |
| JP | A-2004-239214 | 8/2004 |
| JP | A-2005-161973 | 6/2005 |
| JP | A-2007-161193 | 6/2007 |
| JP | A-2007-168560 | 7/2007 |
| JP | A-2007-216809 | 8/2007 |
| JP | A-2007-237857 | 9/2007 |
| JP | B2-4193780 | 10/2008 |
| JP | A-2008-279875 | 11/2008 |
| JP | 2009-66503 | 3/2009 |

OTHER PUBLICATIONS

Office Action mailed Jul. 2, 2013 in corresponding JP Application No. 2010-128230 (and English translation).

* cited by examiner

*Primary Examiner* — Anh V La
(74) *Attorney, Agent, or Firm* — Posz Law Group, PLC

(57) ABSTRACT

A parking aid system is disclosed. The parking aid system includes: a parking space borderline recognition section configured to recognize two borderlines of the parking space based on a captured image, which is captured by an imaging device mounted to the vehicle, the two borderlines respectively being two parts of the parking space boundary opposite to each other in a width direction of the parking space; a displacement calculation section configured to calculate displacement of the vehicle in the width direction with respect to the two borderlines based on positions of the two borderlines in the captured image and an imaging range of the imaging device; and a notifier configured to notify the displacement calculated by the displacement calculation section.

17 Claims, 8 Drawing Sheets

| ANGLE SETTING | |
|---|---|
| THE NUMBER OF RANKS: 3 | |
| ANGLE (deg) | RANK |
| 0 | 1 |
| 1 | |
| 2 | |
| 3 | 2 |
| . | |
| . | |
| . | |
| 7 | 3 |
| . | |
| . | |

| POSITION SETTING | |
|---|---|
| THE NUMBER OF RANKS: 3 | |
| DISPLACEMENT (cm) | RANK |
| 0 | 1 |
| 10 | |
| 20 | 2 |
| . | |
| . | |
| . | |
| 50 | 3 |
| . | |
| . | |
| . | |

PARKING AID SYSTEM

CROSS REFERENCE TO RELATED APPLICATION

The present application is based on Japanese Patent Application No. 2009-138493 filed on Jun. 9, 2009, disclosure of which is incorporated herein by reference.

BACKGROUND OF THE INVENTION

1. Field of the Invention

The present invention relates to a parking aid system, which aids in parking a vehicle into a parking space in a parking lot.

2. Description of Related Art

There is known a technique for aiding a driver in parking a vehicle into a parking space in a parking lot, as described in Japanese Patent No. 4193780 for example. An apparatus described in Japanese Patent No. 4193780 recognizes a parking space boundary provided in a parking lot and calculates an inclination angle of a vehicle with respect to the parking space boundary, based on an image captured by a camera mounted to the vehicle. After the vehicle is moved into the parking space boundary and the parking is finished, and after a gear shifter is changed in a position for forward movement, this apparatus notifies the inclination angle to a driver by using a sound or a synthesized image. In this way, the apparatus can notify the inclination angle of the vehicle with respect to the parking space boundary to the driver.

The inventors of the present application have found that a conventional technique involves the following difficulties.

In some cases, the parking may end up with the following result; although the vehicle is parallel to the parking space boundary, the vehicle may stay in close to one side of the parking space boundary in a width direction of the parking space or the vehicle may straddle one side of the parking space boundary. In other words, a vehicle may be displaced with respect to the parking space boundary in the width direction of the parking space. Since the above conventional technique calculates only the inclination angle of the vehicle with respect to the parking space boundary, it is impossible to notify the driver of the displacement of the vehicle with respect to the parking space boundary in the width direction.

Moreover, according to the above conventional technique, the inclination angle of the vehicle with respect to the parking space boundary is notified after the parking is finished. As a result, if the inclination angle of the vehicle with respect to the parking space boundary is large, the driver may need to retry the parking of the vehicle. There is a room for improvement in preventive measures against this parking retry.

SUMMARY OF THE INVENTION

The present invention is made in view of the forgoing. It is a first objective of the present invention to provide a parking aid system that can notify displacement of a vehicle with respect to a parking space boundary in a width direction. It is a second objective of the present invention to provide a parking aid system that can provide preventive measures against a parking retry.

According to a first aspect of the present invention, there is provide a parking aid system for aiding in parking a vehicle into a parking space defined by a parking space boundary. The parking aid system includes a parking space borderline recognition section, a displacement calculation section and a notifier. The parking space borderline recognition section is configured to recognize two borderlines of the parking space based on a captured image, which is captured by an imaging device mounted to the vehicle. In the above, the two borderlines are respectively two parts of the parking space boundary opposite to each other in a width direction of the parking space. The displacement calculation section is configured to calculate displacement of the vehicle in the width direction with respect to the two borderlines based on positions of the two borderlines in the captured image and an imaging range of the imaging device, the imaging range being determined by reference to the vehicle. The notifier is configured to notify the displacement calculated by the displacement calculation section.

According to the above parking aid system, the two borderlines constituting the parking space boundary are recognized based on the captured image, which is captured by the imaging device. Further, the displacement of the vehicle with respect to the parking space boundary in the width direction is calculated based on the positions of the two borderlines on the captured image and the imaging range of the imaging device by reference to the vehicle. Further, the calculated displacement in the width direction is notified. Through the above manners, it is possible to notify the displacement of the vehicle with respect to the parking space boundary in the width direction.

According to a second aspect of the present invention, there is provide a parking aid system for aiding in parking a vehicle into a parking space defined by a parking space boundary. The parking aid system includes a parking space borderline recognition section, an inclination angle calculation section, a rotation direction instruction image creation section, a display device and a display control section. The parking space borderline recognition section is configured to recognize two borderlines based on a captured image, which is captured by an imaging device mounted to the vehicle. In the above, the two borderlines are respectively two parts of the parking space boundary opposite to each other in a width direction of the parking space. The inclination angle calculation section is configured to calculate an inclination angle of the vehicle with respect to the parking space boundary based on the two borderlines recognized by the parking space borderline recognition section. The rotation direction instruction image creation section is configured to create a rotation direction instruction image indicative of which rotation direction of a steering wheel of the vehicle decreases magnitude of the inclination angle calculated by the inclination angle calculation section. The display device is configured to perform display operation. The display control section is configured to control of the display operation of the display device, the display operation including display of the rotation direction instruction image by the display device.

According to the above parking aid system, the rotation direction instruction image is created so as to indicate which rotation direction of the steering wheel decreases magnitude of the inclination angle calculated by the inclination angle calculation section, in other words, so as to indicate which rotation direction of the steering wheel makes the vehicle parallel to the parking space boundary. The created rotation direction instruction image is displayed by the display device. Thus, the parking aid system can instruct a driver to operate the steering wheel in the indicated the rotation direction by using the rotation angle instruction image. As a result, the parking aid system enables a driver to operate the steering wheel as indicated by the rotation angle instruction image, and enables the driver to park the vehicle in an orientation parallel to the parking space boundary. Therefore, the parking aid system provides preventive measures against parking retry. It should be noted that since the rotation direction of the steering wheel is instructed with an image, a vehicle driver can understand the instructed rotation direction at a glance.

BRIEF DESCRIPTION OF THE DRAWINGS

The above and other objects, features and advantages of the present invention will become more apparent from the following detailed description made with reference to the accompanying drawings. In the drawings:

FIG. 6A is a diagram illustrating a reference setting table that relates to a first inclination angle:

FIG. 6B is a diagram illustrating a reference setting table that relates to displacement;

DETAILED DESCRIPTION OF THE EXEMPLARY EMBODIMENTS

A parking aid system according to one embodiment will be described below with reference to FIGS. 1 to 8.

Figure 1:
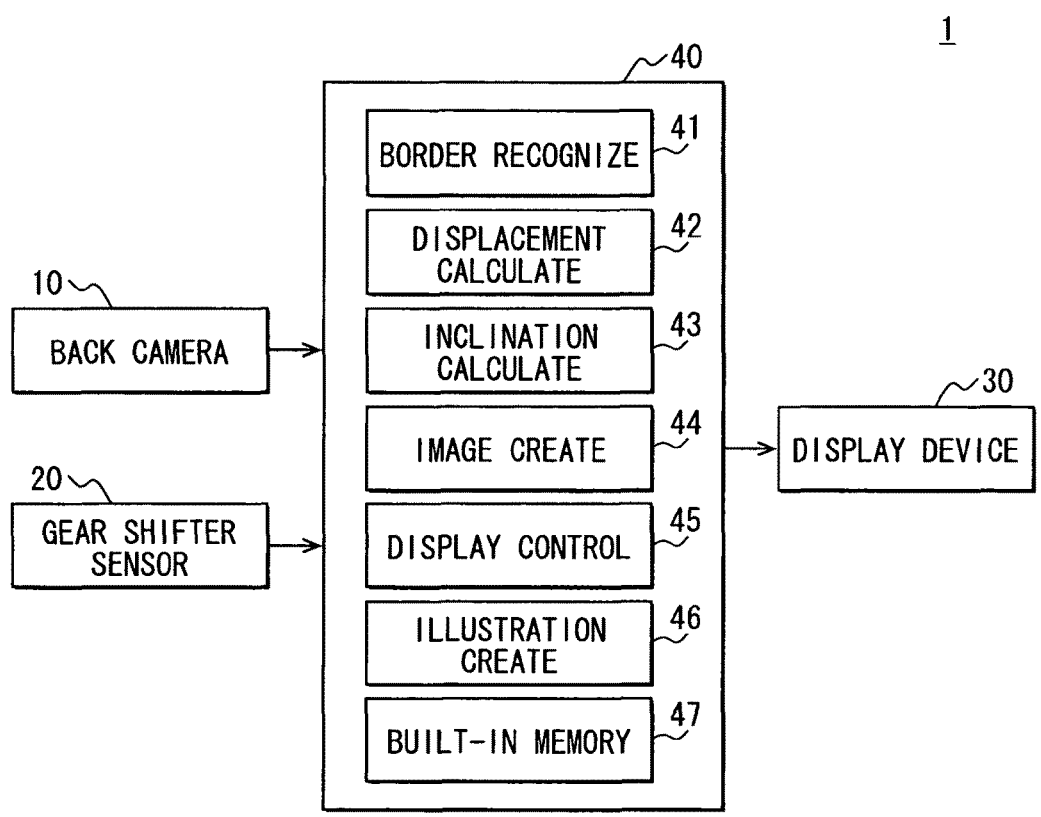
FIG. 1 is a block diagram illustrating a parking aid system according to one embodiment.

The parking aid system 1 is mounted to a vehicle. As shown in FIG. 1, the parking aid system 1 includes a back camera 10, a gear shifter position sensor 20, and a display device 30, and a controller 40.

The back camera 10 is, for example, a CCD (charge coupled device) camera or the like, and is one imaging device. The back camera 10 is mounted to a rear of the vehicle and is connected with the controller 40. The back camera 10 images an area backward of the vehicle to acquire a backward image P, and outputs the backward image P to the controller 40. It is assumed that a parking space (defined by parking space boundary) for one vehicle has two parking blocks and two borderlines. The two parking blocks are used to contact with tires of the vehicle. The two borderlines are respectively two parts of the parking space boundary and are opposite to each other in a width direction of the parking space. The back camera 10 is mounted to an appropriate place of the rear of the vehicle so that when the vehicle is being backed into such parking space, the two parking blocks and the borderlines can be imaged in the backward image P captured by the back camera 10. The back camera 10 can act as an imaging device or a movement direction imaging device. The reward image P can act as a captured image.

The gear shifter position sensor 20 detects position of a gear shifter of the vehicle and outputs a signal indicative of the detected position of the gear shifter to the controller 40. The position of the gear shifter includes a parking (P) position, a reverse (R) position, a neutral (N) position and a drive (D) or forward movement position. To the controller 40, the gear shifter position sensor 20 outputs a parking signal when the gear shifter is in the parking position, outputs a reverse signal when the gear shifter is in the reverse position, outputs a neutral signal when the gear shifter is in the neutral position, and outputs a drive signal when the gear shifter is in the drive position.

The display device 30 includes, for example, a LCD (liquid crystal display), and is attached to an appropriate place in a vehicle compartment. The display device 30 is connected with the controller 40. Display operation of the display device 30 is controlled by the controller 40. The display device 30 displays an image such as the backward image P captured by the back camera 10, images created by the controller 40, and the like. The images created by the controller 40 include a first inclination image GA1, a rotation direction instruction image GD, an illustration indicative of a result of the parking of a vehicle parking with respect to the parking space boundary, an illustration indicative of a result of evaluation of the parking of a vehicle, and the like. The display device 30 can act as a display unit, device or means.

The controller 40 is for example a computer, and includes a CPU (central processing unit) and a built-in memory 47 (e.g., a flush memory). The controller 40 is connected with the back camera 10, the gear shifter position sensor 20 and the display device 30. The controller 40 executes a program stored in the built-in memory 47, thereby can function in various ways. In the following description, it is assumed that the controller 40 can act as or can include a parking space borderline recognition section 41, a displacement calculation section 42, an inclination angle calculation section 43, an image creation section 44, a display control section 45 and an illustration creation section 46. The built-in memory 47 can act as a storage unit, section or means.

The parking space borderline recognition section 41 converts the backward image P captured by the back camera 10 into a birds-eye view image, and detects a straight line in the birds-eye view image based on votes in Hough transform on the birds-eye view image. In this way, the parking space borderline recognition section 41 recognizes two borderlines constituting the parking space boundary. The parking space borderline recognition section 41 can act as a parking space borderline recognition unit, section or means.

More specifically, the parking space borderline recognition section 41 converts the backward image P captured by the back camera 10 into a birds-eye view image. In the above, the birds-eye view image is an image (i) that is converted from the backward image P in such way that each pixel of the backward image P is converted onto a birds eye coordinate system by using a known coordinate system transformation equation, and (ii) that is viewed from a birds eye viewpoint determined from an installation height of the back camera 10. Thus, position and distance on the birds-eye view image have a correspondence relationship with actual position and actual distance on the area imaged on the backward image P. By performing calibration on the vehicle and the back camera 10 in advance, it becomes possible to recognize the actual position and distance with use of the birds-eye view image.

More specifically, the parking space borderline recognition section 41 converts the birds eye view image into a binary image. That is, the parking space borderline recognition section 41 extracts, from the pixels of the birds eye view image, pixels whose luminance is equal to or less than a predetermined luminance, and then the parking space borderline recognition section 41 replaces the luminance of each of the extracted low luminance pixels with the darkest imminence. In addition, the parking space borderline recognition section 41 extracts pixels whose luminance is greater than the predetermined luminance, and replaces the luminance of each of the extracted high luminance pixels into the brightest luminance.

Then, the parking space borderline recognition section 41 performs Hough transform on the binary image and thereby detects a set of straight lines, and puts the detected straight lines in "a set of borderline candidate". The straight lines detected in the binary image may include a straight line originating from a parking block or a shadow of the vehicle body, in addition to the borderline constituting the parking space boundary. In consideration of the above, the straight line detected in the binary image is not unconditionally recognized as the parking space borderline.

The parking space borderline recognition section 41 conducts votes for the straight lines detected in the binary image. The straight line with the number of votes equal to or less than a predetermined threshold is excluded from "borderline candidate". The straight line with the number of votes greater than the predetermined threshold is included in "borderline candidate". A reason for setting the predetermined threshold is that the parking block and the shadow of the vehicle body is typically short compared to the parking space boundary, and thus, the straight line originating from the borderline has the large number of votes while the straight line originating from the parking block or the shadow of the vehicle body has the small number of votes.

The parking space borderline recognition section 41 extracts two parallel straight lines from "borderline candidates", and recognizes the two parallel straight lines as two borderlines constituting the parking space boundary. Furthermore, the parking space borderline recognition section 41 calculates positions of the borderlines and a parking space width, which is a distance between the two borderlines.

Figure 2A:
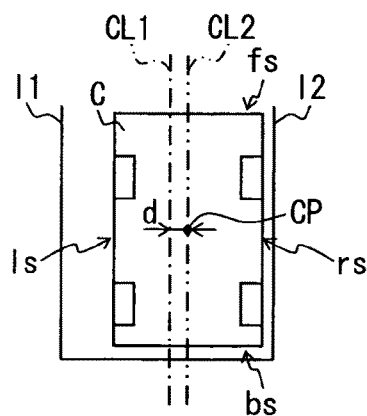
FIG. 2A is a diagram for explaining an exemplary way of calculating a vehicle displacement with respect to a parking space boundary in a width direction.
Figure 2B:
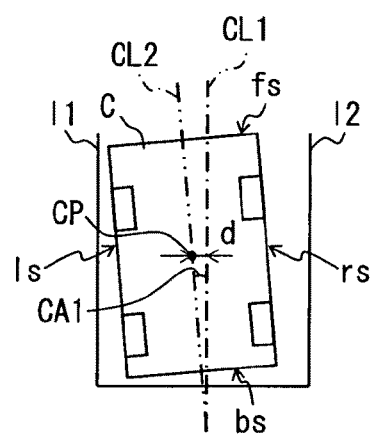
FIG. 2B is a diagram for explaining an exemplary way of calculating a first inclination angle of a vehicle with respect to a parking space boundary.
Figure 3:
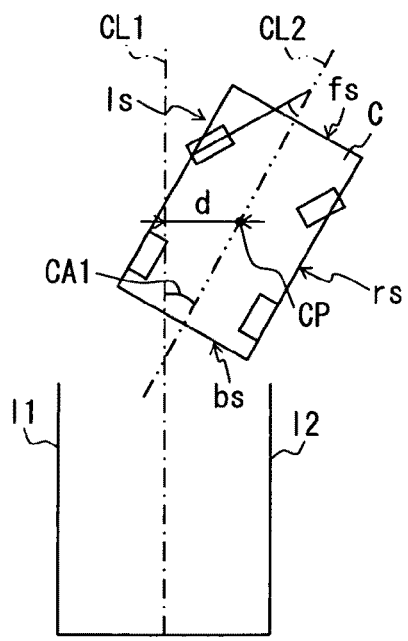
FIG. 3 is a diagram for explaining an exemplary way of calculating a vehicle displacement with respect to a parking space boundary in a width direction and calculating a first inclination angle of the vehicle with respect to the parking space boundary.
Figure 4A:
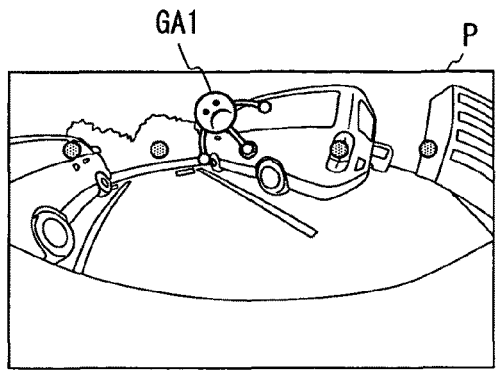
FIGS. 4A to 4D are diagrams each illustrating a first inclination image superimposed on a backward image.
Figure 4B:
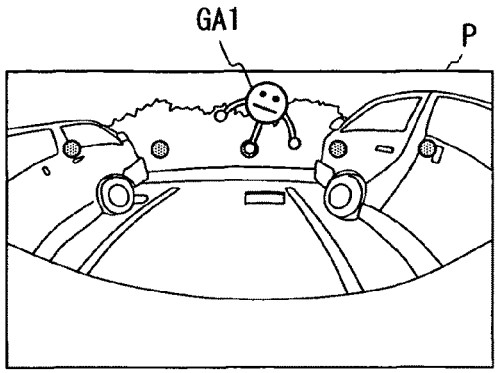
Figure 4C:
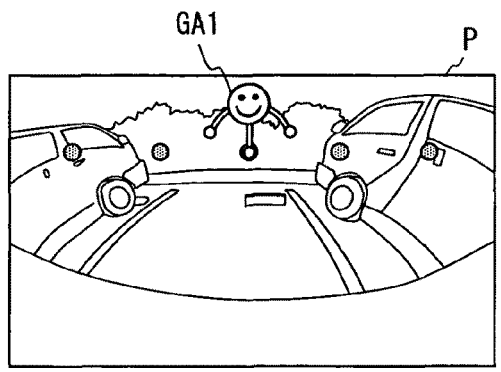
Figure 4D:
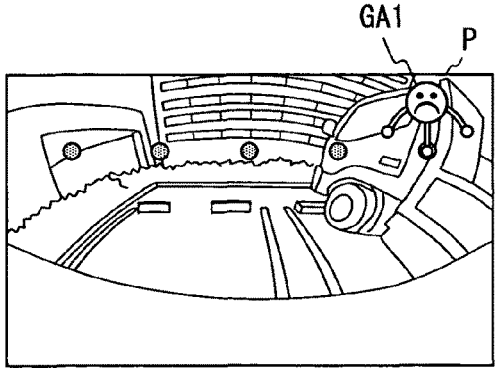

FIGS. 2A, 2B and 3 are diagrams illustrating an exemplary way of calculating displacement "d" of the vehicle in the width direction of the parking space with respect to the parking space boundary, and an exemplary way of calculating first inclination angle "CA1" of the vehicle with respect to the parking space boundary. FIG. 2A illustrates a case where the vehicle is parked parallel to the parking space boundary but is displaced in the width direction so as to be closer to a right side than a left side. FIG. 2B illustrates a case where the vehicle is parked and inclined with respect to the parking space boundary. FIG. 3 illustrates a situation just after start of the parking. With reference to FIGS. 2A, 2B and 3, explanation will be given on the displacement calculation section 42 and the inclination angle calculation section 43.

The displacement calculation section 42 calculates the displacement "d" of the vehicle with respect to the parking space boundary in the width direction, based on positions of the two borderlines "l1" and "l2" in the backward image P and an imaging range of the back camera 10. In the above, the borderlines "l1" and "l2" are detected by the parking space borderline recognition section 41, and the imaging range of the back camera 10 is determined by reference to the vehicle. The displacement calculation section 42 outputs the displacement "d" to the display control section 45. The displacement calculation section 42 can act as a display calculation unit, section or means.

More specifically, the displacement calculation section 42 calculates a center line CL1 of the parking space, where the center line CL1 is located at a same distance from the two borderlines "l1" and "l2" recognized by the parking space borderline recognition section 41. In FIGS. 2A, 2B and 3, the center line CL1 is shown as a dashed-dotted line. The displacement calculation section 42 then calculates a center point CP of the vehicle C, where the center point CP is a front-rear direction center of the vehicle C and is on a vehicle center line CL2, which is located at a same distance from a right side "rs" and a left side "ls" of the vehicle both lateral sides of the vehicle C (i.e., both lateral sides of the vehicle C). In FIGS. 2A, 2B and 3, the center line CL2 of the vehicle C is shown as a dashed-two-dotted line. Then, the displacement calculation section 42 calculates a distance between the reference center line CL1 of the parking space and the center point CP of the vehicle and sets the calculated distance as the displacement "d" of the vehicle with respect to the parking space boundary in the width direction. It should be noted that the front-rear direction center of the vehicle C is a point located at a same distance from the front side "fs" and the rear side "bs" of the vehicle C, and located on the center line CL2, which is located at a same distance from the right side "rs" and the left side "ls" of the vehicle C.

In the present embodiment, the displacement calculation section 42 calculates the displacement "d" with reference to the center point CP of the vehicle C, so that the displacement "d" is calculated to be a positive value when the center line CL1 of the parking space is located on a right side of the center point CP (the center line CL1 is located closer to the right side "rs" of the vehicle C than the left side "ls"), and the displacement "d" is calculated to be a negative value when the center line CL1 of the parking space is located on a left side of the center point CP (the center line CL1 is located closer to the left side "ls" of the vehicle C than the right side "rs"). Thus, in the case of FIG. 2A, the displacement "d" is a negative value. In the case of FIG. 2B, the displacement "d" is a positive value. In the case of FIG. 3, the displacement "d" is a negative value.

According to a way of calculating the displacement "d" In the present embodiment, a distance between the center line CL1 of the parking space and the center point CP of the vehicle is calculated as the displacement "d" of the vehicle with respect to the parking space boundary in the width direction. It should be noted that location of the center point CP of the vehicle is unchanged when the vehicle is inclined. Thus, it is possible to calculate the displacement "d" of the vehicle with respect to the parking space boundary in the width direction in various cases including: a case (see FIG. 2A) where the vehicle is parked parallel to the parking space boundary; a case (see FIG. 2B) where the vehicle is parked and inclined with respect to the parking space boundary; and a case (see FIG. 3) where the parking of a vehicle into the parking space boundary has not been finished yet.

In the above exemplary way, the distance between the center line CL1 of the parking space and the center point CP of the vehicle is calculated as the displacement "d". However, a way of calculating the displacement "d" is not limited to the above way. For example, a distance between the center line CL1 of the parking space and a gravity center of the vehicle may be calculated as the displacement "d". Alternatively, half of a difference value between a distance from the parking line "l1" to the vehicle center point CP and a distance from the parking line "l2" to the vehicle center point CP may be calculated as the displacement "d".

Based on the two borderlines detected by the parking space borderline recognition section 41, the inclination angle calculation section 43 calculates the first inclination angle CA1, which an inclination angle of the vehicle with respect to the parking space boundary. The inclination angle calculation section 43 outputs the calculated first inclination angle CA1 to the image creation section 44. The inclination angle calculation section 43 can act as an inclination angle calculation unit, section or means.

More specifically, the inclination angle calculation section 43 calculates the center line CL1 of the parking space, where the center line CL1 is located at the same distance from the two borderlines "l1" and "l2" detected by the parking space borderline recognition section 41. Then, the inclination angle calculation section 43 calculates the center line CL2 of the vehicle C, where the center line CL2 is located at the same distant from the right side "rs" and the left side "ls" of the vehicle C. Then, the inclination angle calculation section 43 calculates an angle between the parking space center line CL1 and the vehicle center line CL2 as the first inclination angle CA1 of the vehicle with respect to the parking pace boundary.

In the present embodiment, when the vehicle center line CL2 and the parking space center line CL1 are parallel to each other, the first inclination angle CA1 is calculated to be zero. When the parking space center line CL1 is inclined in a clockwise direction with respect to the vehicle center line CL2, the first inclination angle CA1 is calculated to be positive. When the parking space center line CL1 is inclined in an anticlockwise direction with respect to the vehicle center line CL2, the first inclination angle CA1 is calculated to be negative. Due to the above definition, the first inclination angle CA1 is zero in the case of FIG. 2A, and is a positive value in the case of FIG. 2B. In the case of FIG. 3, the first inclination angle CA1 is a negative value.

In the above exemplary way, an angle between the parking space borderline CL1 and the vehicle center line CL2 is calculated as the first inclination angle CA1 of the vehicle with respect to the parking space boundary. Alternatively, another value may be calculated as the first inclination angle CA1. For example, an angle between the parking space center line CL1 and a straight line along a lateral side of the vehicle, or an angle of the vehicle center line CL2 with respect to one of two borderlines "l1", "l2" may be calculated as the first inclination angle CA1.

In the above example configuration, a single back camera 10 is used as an imaging device for capturing a backward image P. Thus, just before the completion of parking, the two borderlines "l1" and "l2" constituting the parking space boundary may be located outside of the imaging range of the back camera 10, and the borderlines "l1" and "l2 cannot be imaged on the backward image P. In this case, the calculation of the parking space center line CL1 based on the two parking lines "l1", "l2" may become impossible.

More specifically, since the votes for the two borderlines "l1", "l2" exceed the threshold at the start of parking, the two borderlines "l1" and "l2" can be successfully extracted as "borderline candidate". However, just before the completion of parking, the votes may become equal to or less than the threshold, and the two borderlines "l1", "l2" may not be extracted as "borderline candidate". As a result, the parking space borderline recognition section 41 cannot recognize the two borderlines constituting the parking space boundary and cannot calculate the center line CL1 of the parking space. Eventually, the displacement calculation section 42 cannot calculate the displacement "d", and the inclination angle calculation section 43 cannot calculate the first inclination angle CA1.

In view of the above, the present embodiment detects an auxiliary straight line located backward of the vehicle, before the two borderlines "l1" and "l2" becomes outside of the imaging range and becomes unable to be imaged on the backward image P. Then, the reference used for calculating the displacement "d" and the first inclination angle CA1 is switched into the detected auxiliary straight line in order to enable the calculation of the displacement "d" and the first inclination angle CA1.

More specifically, the parking space borderline recognition section 41 not only extracts two parallel straight lines from "borderline candidate" to recognize the two borderlines "l1", "l2" constituting the parking space boundary, but also extracts, from "borderline candidate", a arbitrary straight line that is located more distant from a vehicle approach side of the parking space than the two borderlines are from the vehicle approach side. Thereby, the extracted straight line is prospectively recognized as the auxiliary straight line.

In addition, the parking space borderline recognition section 41 acquires a positional relationship between the parking space center line CL1 and the auxiliary straight line while the two borderlines "l1" and "l2" are being recognized, in other words, while the calculation of the center line CL1 of the parking space is possible. Thereby, the positional relationship is prospectively acquired.

Then, when the recognition of the two borderlines by the parking space borderline recognition section 41 becomes impossible and the calculation of the parking space center line CL1 becomes impossible, the displacement calculation section 42 calculates the displacement "d" by using the vehicle center point CP, the auxiliary straight line, and the positional relationship between the auxiliary straight line and the parking space center line "CL1".

In the similar way, the inclination angle calculation section 43 also calculates the first inclination angle CA1 by using the vehicle center line CL2, the auxiliary straight line, and the positional relationship between the auxiliary straight line and the parking space center line "CL1", when the recognition of the two borderlines by the parking space borderline recognition section 41 becomes impossible and the calculation of the parking space center line CL1 becomes impossible.

According to the above manners, since it is possible to calculate the displacement "d" and the first inclination angle "CA1" based on the backward image P captured by the "single" back camera 10, it is possible to simplify a configuration of the parking aid system, and it is possible to accordingly reduce a production cost.

In the above example, the parking space borderline recognition section 41 extracts an arbitrary straight line that is located more backward of the parking space than the two borderlines "l1" and "l2" are. However, the auxiliary line is not limited to this. For example, a predetermined "curved line" may be extracted and a positional relationship between the predetermined curved line and the two borderlines "l1" and "l2" may be prospectively acquired. In other words, as long as an auxiliary line to be detected is located more backward of the parking space than the two borderlines "l1" and "l2" are, it may not matter whether the auxiliary line is straight, curved or the line in shape.

Figure 5A:
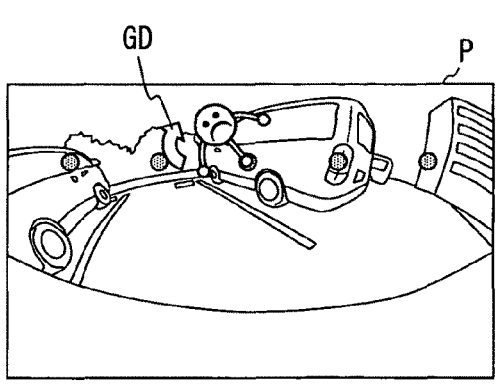
FIGS. 5A and 5B are diagrams each illustrating a rotation direction instruction image superimposed on a backward image.
Figure 5B:
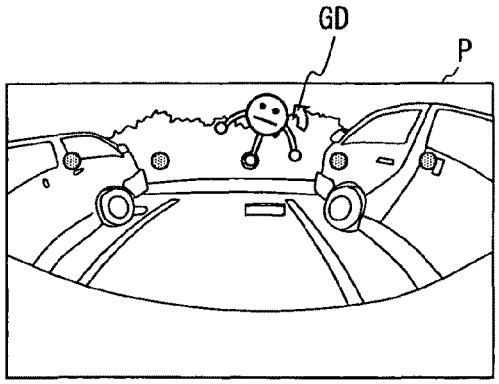

FIGS. 4A to 4D are diagram each illustrating the exemplary display of the first inclination image GA1 superimposed on the backward image P. FIGS. 5A and 5B are diagram each illustrating the exemplary display of the rotation direction instruction image GD superimposed on the backward image P. FIGS. 6A and 6B are diagrams respectively illustrating the exemplary reference setting tables T1 and T2. With reference to FIG. 4A to FIG. 6B, explanation will be given below on the image creation section 44 and the display control section 45.

The image creation section 44 creates the first inclination image GA1 indicative of the first inclination angle CA1 calculated by the inclination angle calculation section 43. The image creation section 44 outputs the created first inclination image GA1 to the display control section 45. The image creation section 44 can act as an inclination image creation unit, section or means. The display control section 45 can act as a display control unit, section or means.

More specifically, the image creation section 44 imports the first inclination angle CA1 calculated by the inclination angle calculation section 43, and reads the reference setting table T1, which is stored in the built-in memory 47. In the reference setting table T1, multiple reference thresholds are set for measure of the magnitude of the first inclination angle CA1, and multiple ranks are set to rank the first inclination angle CA1 based on which of the multiple reference thresholds the first inclination angle CA1 reaches. By referencing the reference setting table T1, the image creation section 44 determine one of the multiple ranks that corresponds to the magnitude of the first inclination angle CA1. The image creation section 44 creates the first inclination angle image GA1 based on a degree of inclination corresponding to the determined rank and the sign (positive or negative) of the first inclination angle CA1. Then the image creation section 44 outputs the created first inclination image GA1 to the display control section 45.

Furthermore, the image creation section 44 creates the rotation angle instruction image GD indicative of which rotation direction of a steering wheel of the vehicle decreases the first inclination angle calculated by the inclination angle calculation section 43, so that size of the rotation angle instruction image GD corresponds to a magnitude of the rotation angle of the steering wheel, the magnitude causing the first inclination angle to be zero. The image creation section 44 outputs the created rotation angle instruction image GD to the display control section 45. The image creation section 44 can act as a rotation direction instruction image creation unit, section or means.

More specifically, the image creation section 44 creates "an arrow representative of a clockwise direction" as the rotation angle instruction image GD when the calculated first inclination angle CA1 is determined to be a negative angle. When the calculated first inclination angle CA1 is determined to be a positive angle, the image creation section 44 creates "an arrow representative of an anticlockwise direction" as the rotation angle instruction image GD. In the above, the image creation section 44 references the reference setting table T1 and determines the rank according to the magnitude of the first inclination angle CA1, and creates the rotation direction instruction image GD so that size of the rotation direction instruction image GD depends on the determined rank of the first inclination angle CA1. It should be noted that when the first inclination angle CA1 is determined to be zero, the image creation section does not create the rotation direction instruction image GD. The image creation section 44 outputs the rotation direction instruction image GD to the display control section 45 unless the image GD is not created.

Here, let us consider an example case where the calculated first inclination angle CA1 is −7 degrees. In this case, the image creation section 44 determines, through referencing the reference setting table T1, that the first inclination angle CA1 is in "the third rank". Then, the image creation section 44 creates "a balance toy image inclined anticlockwise to a large degree (see FIG. 4A)" as the first inclination image GA1, and also creates "a larger-size arrow representative of a clockwise direction (see FIG. 5A)" as the rotation direction instruction image GD. The image creation section 44 outputs the first inclination image GA1 and the rotation direction instruction image GD to the display control section 45.

Let us consider another example case where the calculated first inclination angle CA1 is +3 degrees. In this case, the image creation section 44 determines, through referencing the reference setting table T1, that the first inclination angle CA1 is in "the second rank". Then, the image creation section 44 creates "a balance toy image inclined clockwise to a medium degree (see FIG. 4B)" as the first inclination image GA1, and also creates "a medium-size arrow representative of an anticlockwise direction (see FIG. 5B)" as the rotation direction instruction image GD. The image creation section 44 outputs the first inclination image GA1 and the rotation direction instruction image GD to the display control section 45.

In yet another example case, the calculated first inclination angle CA1 is zero. In this case, the image creation section 44 determines, through referencing the reference setting table T1, that the first inclination angle CA1 is in "the first rank". Then, the image creation section 44 creates "a balance toy image that is horizontally-balanced (see FIGS. 4C and 4D)" as the first inclination image GA1, and outputs this first inclination image GA1 to the display control section 45.

As can be seen from the above, the image creation section 44 creates a balance toy image as the first inclination image so that the balance toy image is rotated around an end point thereof by a larger angle with a larger magnitude of the first inclination angle CA1, and the balance toy image is closer to a horizontally-balanced position with a smaller magnitude of the first inclination angle CA1. Furthermore, the image creation section 44 creates an arrow as the rotation angle instruction image GD, so that size of the arrow is larger as the magnitude of the first inclination angle CA1 is larger, and size of the arrow is smaller as the magnitude of the first inclination angle CA1 is smaller. Then, the image creation section 44 outputs the first inclination image GA1 and the rotation direction instruction image GD to the display control section 45.

Although the image creation section 44 creates the first inclination image GA1 having three inclination levels of "large degree", "medium degree" and "horizontally-balanced" in the above example, the first inclination image GA1 is not limited to this example. For example, since the first inclination angle CA1 can be measured and calculated in increment of "1 degree" in the present embodiment, a balance toy image having more than three inclination levels (e.g., in increment of 1 degree) may be created as the first inclination angle image GA1. In this case, the reference setting table T1 employed in the present embodiment may have more than three thresholds for ranking the magnitude of the first inclination angle CA1, and may have more than three ranks to indicate which of the thresholds the magnitude of the first inclination angle CA1 reaches. Alternatively, a setting window for changing the reference setting table T1 may be provided, and the reference setting table T1 may be changed according to user operation. This enables the reference setting table T1 to be changed according to user preference.

The display control section 45 control image display operation of the display device 30 in the following way. The display control section 45 causes the display device 30 to display the backward image P captured by the back camera 10. In addition, the display control section 45 causes the display device 30 to superimpose the first inclination image GA1 and the rotation direction instruction image GD on the backward image P, so that locations of the first inclination image GA1 and the rotation direction instruction image GD on the backward image P correspond to the displacement "d".

More specifically, the display control section 45 imports the backward image P captured by the back camera 10, and causes the display device 30 to display the imported backward image P. Then, the display control section 45 imports the first inclination image GA1 and the rotation direction instruction image GD each created by the image creation section 44, and further imports the displacement "d" calculated by the displacement calculation section 42, and reads a reference setting table T2 stored in the built-in memory 47. In the reference setting table T2, multiple reference thresholds are set for measure of the magnitude of the displacement "d", and multiple ranks are set in order to rank the displacement "d" through determining which of the multiple reference thresholds the displacement "d" reaches. Referencing the reference setting table T2, the display control section 45 determines one of the ranks that corresponds to the magnitude of the displacement "d". Further, the display control section 45 superimposes the first inclination image GA1 and the rotation direction instruction image GD on the backward image P so that the first inclination image GA1 and the rotation direction instruction image GD are placed at a part corresponding to the determined rank.

For example, when the displacement "d" is calculated to be "−10 cm", the display control section 45 references the reference setting table T2 and determines that the displacement "d" is in "the first rank", because the magnitude of the displacement "d" is "10 cm". Then, the display control section 45 superimposes the first inclination image GA1 and the rotation direction instruction image GD on the backward image P so that the first inclination image GA1 and the rotation direction instruction image GD are located at an upper "center" part of the backward image P (see FIGS. 4A to 4C, 5A and 5B).

Let us consider another example where the displacement "d" is calculated to be "+50 cm". In this case, the display control section 45 references the reference setting table T2 and determines that the displacement "d" is in "the third rank", because the magnitude of the displacement "d" is "50 cm". Then, because the sign of the displacement "d" is positive, the display control section 45 superimpose the first inclination image GA1 on the backward image P so that the first inclination image GA1 is located at an upper "right end" part of the backward image P (see FIG. 4D).

As can be seen from the above example cases, the display control section 45 superimposes the first inclination image GA1 and the rotation direction instruction image GD on the backward image P in the following way. As the magnitude of the displacement "d" is larger, the image GA1 and the image GD are placed more distant from the center of the backward image P. As the magnitude of the displacement "d" is smaller, the image GA1 and the image GD are placed closer to the center of the backward image P. The image GA1 and the image GD are placed on a right side of the center the backward image P when the displacement "d" is positive, and are placed on a left side of the center the backward image P when the displacement "d" is negative.

In one embodiment, the display control section 45 may control display operation of the display device 30 so that the first inclination image GA1 and the rotation direction instruction image GD are placed at selectively one of five parts of the backward image P in a horizontal direction, the parts including "an end part", "a middle part" (which is between the end part and the center part) or "a center part" of the backward image P. It should be noted that the display control operation is not limited to the operation. For example, the display control section 45 may control display operation so that the first inclination image GA1 and the rotation direction instruction image GD are placed at selectively one of more than five parts of the backward image P in the horizontal direction (e.g., the parts may be defined in increment of one pixel). In this case, the reference setting table T2 employed in one embodiment may have more than three thresholds for ranking the magnitude of the displacement "d", and may have more than three ranks to indicate which of the thresholds the magnitude of the displacement "d" reaches. Alternatively, a setting window for changing the reference setting table T2 may be provided, and the reference setting table T2 may be changed according to user operation. This enables the reference setting table T1 to be changeable according to user preference.

Figure 7A:
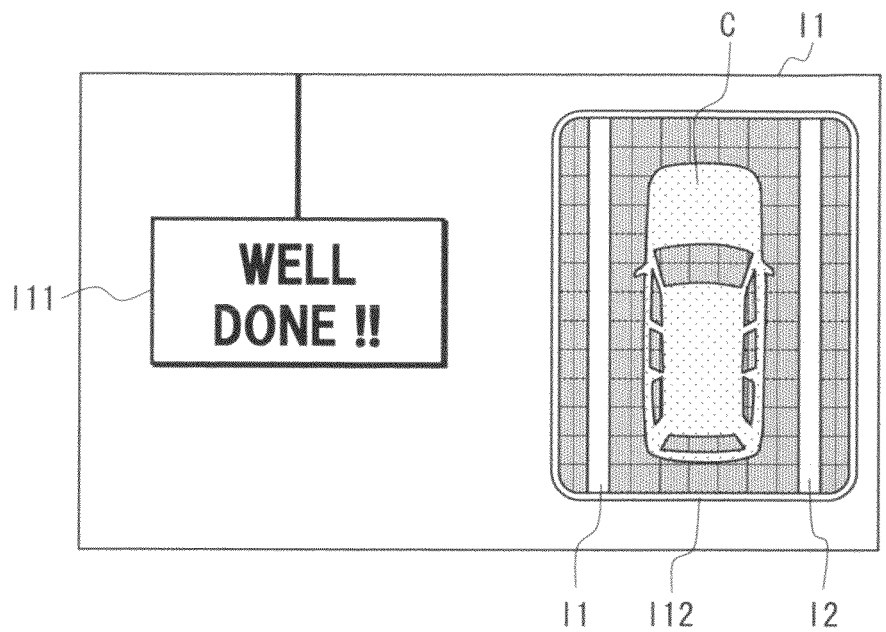
FIG. 7A is a diagram illustrating an exemplary illustration that is displayed on a display device when a vehicle is appropriately parked with respect to a parking space boundary, the illustration indicating a parking result and an evaluation result.
Figure 7B:
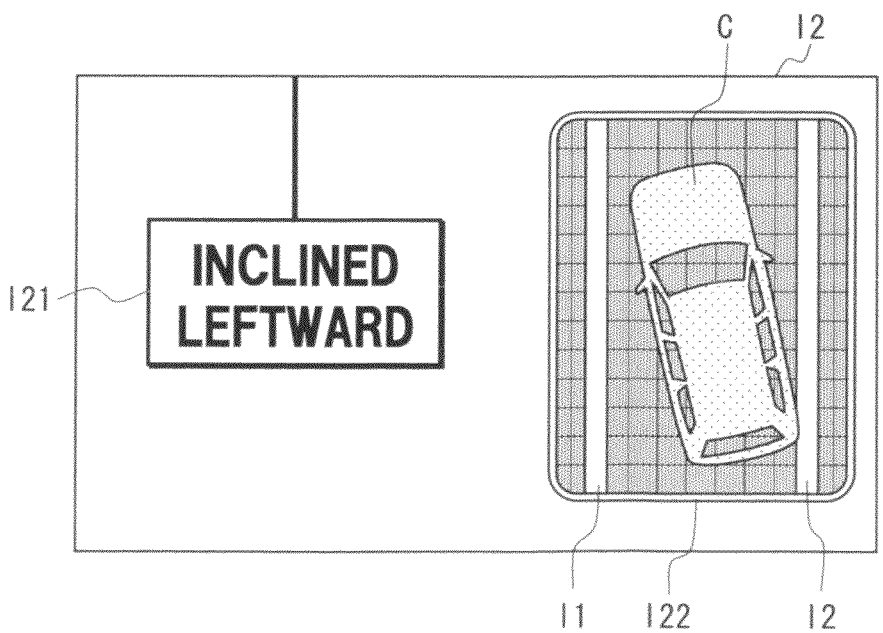
FIG. 7B is a diagram illustrating an exemplary illustration that is displayed on a display device when a vehicle is not appropriately parked with respect to a parking space boundary, the illustration indicating a parking result and an evaluation result.

FIG. 7A is a diagram illustrating an illustration I11 indicative of a parking result and another illustration I12 indicative of an evaluation result of the parking result, where the illustrations I11 and I12 are to be displayed when the vehicle C is appropriately parked with respect to the parking space boundary. FIG. 7B is a diagram illustrating an illustration I21 indicative of a parking result and another illustration I22 indicative of an evaluation result of the parking result, where the illustrations I21 and I22 are to be displayed when the vehicle C is parked and is inclined with respect to the parking space boundary. With reference to FIGS. 7A and 7B, explanation is given below on the illustration creation section 46 and the display control section 45.

The illustration creation section 46 creates, after the finish of parking, an illustration indicative of a result of the parking of the vehicle with respect to the parking space boundary and another illustration indicative of a result of evaluation of the parking of the vehicle, based on the displacement "d" calculated by the displacement calculation section 42 and the first inclination angle CA1 calculated by the inclination angle calculation section 43. The illustration creation section 46 outputs these created illustrations to the display control section 45.

More specifically, when the illustration creation section 46 receives a signal other than the reverse signal from the gear shifter position sensor 20 after receiving the reverse signal from the gear shifter position sensor 20, the illustration creation section 46 determines that the parking of the vehicle into the parking space boundary is finished.

When the illustration creation section 46 determines that the parking of the vehicle into the parking space boundary is finished, the illustration creation section 46 imports the parking space width from the parking space borderline recognition section 41. By using the imported parking space width, the illustration creation section 46 creates an image of the two borderlines "I1" and "I2" constituting the parking space boundary. When the image of the two borderlines "I1" and "I2" is created, the illustration creation section 46 imports the displacement "d" calculated by the displacement calculation section 42 and the first inclination angle CA1 calculated by the inclination angle calculation section 43. By using the imported displacement "d" and first inclination angle CA1, the illustration creation section 46 creates an image of the vehicle C over the two borderlines "I1" and "I2" constituting the parking space boundary. It should be noted that a parking block may be omitted in the illustration created by the illustration creation section 46.

Through the above manners, the illustration creation section 46 creates the illustration I12, I22, which indicates a result of the parking of the vehicle C through providing information on the first inclination angle CA1 and the displacement "d". The illustration creation section 46 outputs the illustration I12, I22 to the display control section 45.

Moreover, when the illustration creation section 46 imports the first inclination angle CA1 and the displacement "d", the illustration creation section 46 reads the reference setting tables T1 and T2 stored in the built-in memory 47. By referencing the reference setting tables T1 and T2, the illustration creation section 46 determines the rank corresponding to the magnitude of the first inclination angle "CA1" and the rank corresponding to the magnitude of the displacement "d". The illustration creation section 46 evaluates the result of the parking based on the determined ranks, and creates the illustration "I11", "I21" indicative of a result of the evaluation. The illustration creation section 46 can act as a parking result evaluation unit, section or means.

More specifically, if each of the displacement "d" and the first inclination angle CA1 is in "the first rank", it means that the vehicle is appropriately parked with respect to the parking space boundary. In this case, the illustration creation section 46 creates the illustration I11 (see FIG. 7A), which says, for example, "Congratulations, You Have Done Well". By contrast, if the displacement "d" is in "the first rank" but the first inclination angle CA1 is in "the third rank", it means that the vehicle is not appropriately parked with respect to the parking space boundary. In this case, the illustration creation section 46 creates the illustration I21 (see FIG. 7B), which says, for example, "Vehicle is inclined leftward".

Through the above-described way, the illustration creation section 46 creates the illustration "I11", "I21", which indicates a result of evaluation of the parking of the vehicle through providing information on the first inclination angle "CA1" and the displacement "d", and outputs the illustration "I11", "I21" to the display control section 45.

When the display control section 45 imports the illustration indicative of the result of the parking and the illustration indicative of the result of the evaluation, the display control section 45 causes the display device 30 to display the imported illustrations.

In the above embodiment, the illustration creation section 46 creates, but no limited to, the illustrations indicative of the parking result and the evaluation result. Alternatively, the illustration creation section 46 may create an illustration indicative of a result of scoring the parking result, in addition to the illustrations indicative of the parking result and the evaluation result.

More specifically, the allocation of points for scoring may be defined in the reference setting tables T1 and T2 in relation to the first inclination angle CA1 and the displacement "d". For example, "fifty points", "forty points" and "twenty points" may be respectively allocated to "the first rank", "the second rank" and "the third rank" of the first inclination angle CA1. In a similar manner, "fifty points", "forty points" and "twenty points" may be respectively allocated to "the first rank", "the second rank" and "the third rank" of the displacement "d". By referencing the reference setting tables T1 and T2, the illustration creation section 46 determines the points corresponding to the magnitude of the first inclination angle CA1 and the points corresponding to the magnitude of the displacement "d", and adds the determined points, thereby scoring the parking result. The illustration creation section 46 may creates an illustration (not shown) indicative of the scoring result. The illustration creation section 46 can act as a parking result scoring unit, section or means.

Moreover, the illustration creation section 46 may accumulatively record and store the scoring result of the parking result in the built-in memory 47. The display control section 45 may read the scoring results stored in the built-in memory 47 and may cause the display device 30 to display a graph showing transition of the scoring results from past to present.

Alternatively, the illustration creation section 46 may create at least one of the illustration indicative of a result of parking, the illustration indicative of a result of evaluation of the parking and the illustration indicative of a result of score of the parking, and may output the at least one to the display control section 45 and the display device 30. Alternatively, the illustration creation section 46 may not create the above illustrations, so that the display control section 45 does not cause the display device 30 to display the illustrations.

Figure 8:
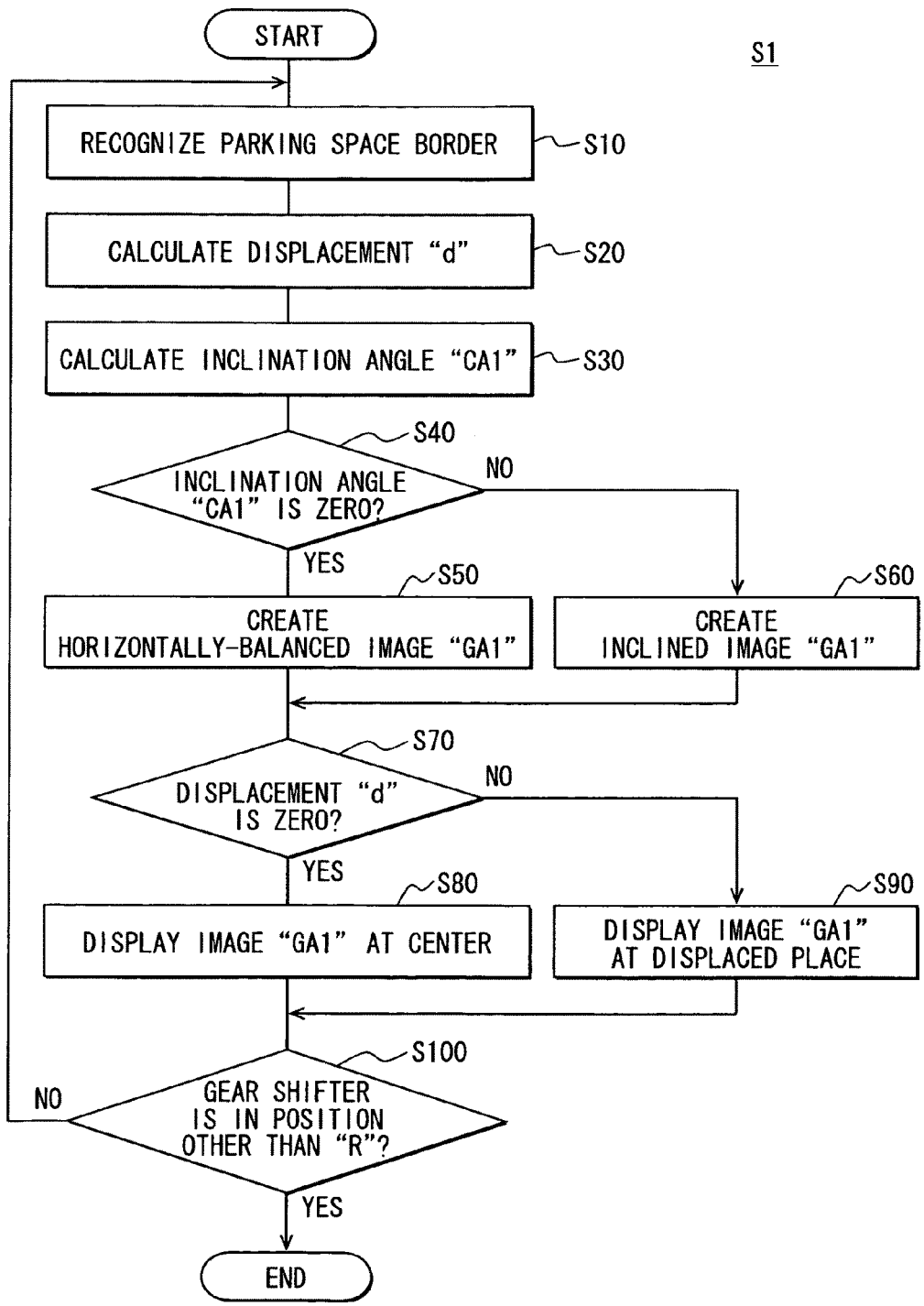
FIG. 8 is a flowchart illustrating a parking aid procedure.

FIG. 8 is a flowchart illustrating a parking aid procedure S1 to be performed by the parking aid system 1. With reference to FIG. 8, operation of the parking aid system will be summarized below.

Based on the signal inputted from the gear shifter position sensor 20, the controller 40 cyclically determines at predetermined time intervals whether the parking is started. In response to a change in position of the gear shifter into the reverse position, the controller 40 determines that the parking is started. When the parking is started, the controller starts performing the parking aid procedure S1.

When performing the parking aid procedure S1, the parking aid system 1 performs processes including the followings. At S10, the controller 40 recognizes the parking space boundary provided in a parking lot. More specifically, the parking space borderline recognition section 41 recognizes the two borderlines "I1" and "I2" constituting the parking space boundary and calculates the position of the parking space boundary and the parking space width (which is a distance between the two borderlines "I1" and "I2"), based on the backward image P captured by the back camera 10.

After recognizing the parking space boundary, the controller 40 calculates at S20 the displacement "d" of the vehicle with respect to the parking space boundary in the width direction. More specifically, the displacement calculation section 42 calculates the displacement "d" of the vehicle with respect to the parking space boundary in the width direction, based on the backward image P captured by the back camera 10. The displacement calculation section 42 outputs the displacement "d" to the display control section 45.

After calculating the displacement "d", the controller 40 calculates at S30 the first inclination angle CA1, which is an inclination angle of the vehicle with respect to the parking space boundary. More specifically, the inclination angle calculation section 43 calculates the first inclination angle CA1 based on the backward image captured by the back camera 10, and outputs the calculated first inclination angle CA1 to the image creation section 44.

After calculating the first inclination angle CA1, the controller 40 determines at S40 whether the first inclination angle is zero or not. When the first inclination angle CA1 is determined to be zero, corresponding to "YES" at S40, the process proceeds to S50. In the above, the determination "YES" at S40 means that the vehicle is not inclined to but parallel to the parking space boundary. At S50, the image creation section 44 creates "a balance toy image with a horizontally-balanced position" as the first inclination image GA1, and outputs the created first inclination image GA1 to the display control section 45. By contrast, when it is determined that the first inclination angle CA1 is not zero, corresponding to "NO" at S40, the process proceeds to S60. In the above, the determination "NO" at S40 means that the vehicle is inclined with respect to the parking space boundary. At S60, the image creation section 44 creates "a balance toy image inclined clockwise or anti-clockwise" as the first inclination image GA1, and outputs the created first inclination image GA1 to the display control section 45. In one embodiment, the image creation section 44 further creates "an arrow representative of an anticlockwise or clockwise direction" as the rotation direction instruction image GD, and outputs the rotation direction instruction image GD to the display control section 45.

After S50 or S60, the process proceeds to S70 where the controller 40 determines whether the displacement "d" is zero or not. When the displacement "d" is determined to be zero, corresponding to "YES" at S70, the process proceeds to S80. In the above, the determination "YES" at S70 means that there is no displacement of the vehicle with respect to the parking space boundary in the width direction. At S80, the image creation section 44 or the display control section 45 displays the first inclination image GA1 and the rotation direction instruction image GD at a center part of a screen of the display device 30. By contrast, when it is determined that the displacement "d" is not zero, the determination "NO" is made at S70, and the process proceeds to S90. In the above, the determination "NO" at S70 means that there is a displacement of the vehicle with respect to the parking space boundary in the width direction. At S90, the image creation section 44 or the display control section 45 displays the first inclination image GA1 and the rotation direction instruction image GD on the screen of the display device 30 so that the images GA1 and GD are displaced from the center part of the screen of the display device 30.

After S80 or S90, the process proceeds to S100 where the controller 40 determines whether the gear shifter is in a position other than "R" position. When it is determined that the gear shifter is not in a position other than "R" position, the determination "NO" is made at S100 and the process returns to S10 so that processes S10 to S100 are performed again. In the above, the determination "NO" at S100 means that the parking has not been finished yet. By contrast, when it is determined that the gear shifter is in a position other than "R" position, the determination "YES" is made at S100. The determination "YES" at S100 means that the parking has already been finished. Thus, when the determination "YES" is made at S100, the controller 40 causes the display device 30 to display the illustration indicative of a result of the parking and the illustration indicative of a result of evaluation of the parking (see FIGS. 7A and 'B), and the parking aid procedure S1 is ended.

In the above parking aid system 1, as explained above, the controller 40 superimposes the first inclination image GA1 and the rotation direction instruction image GD on the backward image P in the following way. As the magnitude of the displacement "d" is larger, the images GA1 and GD are placed distant from the center of the backward image P. As the magnitude of the displacement "d" is smaller, the images GA1 and GD are placed closer to the center of the backward image P. The images GA1 and GD are placed on a right side of the center of the backward image P when the displacement "d" is positive. The images GA1 and GD are placed on a left side of the center of the backward image P when the displacement "d" is negative. Thus, the parking aid system 1 can notify the displacement of the vehicle with respect to the parking space boundary by using the locations of the first inclination image GA1 and the rotation angle instruction image GD on the backward image P. As a result, the driver of the vehicle can intuitively recognize the displacement of the vehicle. It should be noted that the parking aid system 1 can determine whether the vehicle straddles the parking space boundary based on the magnitude of the displacement "d".

Furthermore, in the parking aid system 1, the controller 40 superimposes the rotation angle instruction image GD on the backward image P, so that the first inclination angle instruction image GD is in the form of an arrow whose size is larger as the magnitude of the first inclination angle CA1 is larger and whose size is smaller as the magnitude of the first inclination angle CA1 is smaller. Through the above manners, the parking aid system 1 can instruct which rotation direction of the steering wheel makes the vehicle parallel to the parking space boundary, by using the indicated direction of the arrow, which is the rotation direction image GD superimposed on the backward image P. In addition, by using the size of the rotation direction instruction image superimposed on the backward image P, the parking aid system 1 can inform a magnitude of the rotation angle of steering wheel for making the vehicle parallel to the parking space boundary. As a result, the parking aid system 1 enables a driver to operate the steering wheel in line with the instructions provided by the rotation angle instruction image GD, and thereby enables the driver to park the vehicle parallel to the parking space boundary. The parking aid system 1 can prevent a retry of parking. Moreover, since the rotation direction and the rotation angle of the steering wheel are instructed with the use of an image, the driver of the vehicle can understand the instructions at a glance.

Furthermore, in the parking aid system 1, the controller 40 creates the balance toy image as the first inclination image, and superimposes the first inclination image on the backward image P in the following way. The balance toy image is inclined to a larger degree as the magnitude of the first inclination angle CA1 is larger. The position of the balance toy image is closer to a horizontally-balanced position as the first inclination angle CA1 is smaller. As a result, the parking aid system 1 can notify the first inclination angle of the vehicle with respect to the parking space boundary by using the inclination degree of the first inclination image GA1 superimposed on the backward image P, thereby enabling the driver of the vehicle to intuitively recognize the inclination angle of the vehicle.

The parking aid system 1 is not limited to the above-described configuration and can be modified in the various ways. Examples of modifications will be described below.

In the above-described parking aid system 1, the controller 40 superimposes the rotation direction instruction image GD on the backward image P so that: the size of the rotation direction instruction image GD corresponds to the magnitude of the rotation angle of the steering wheel; and the location of the rotation direction instruction image GD on the backward image P corresponds to the displacement "d". However, the display of the rotation direction instruction image GD is not limited to this example. For example, the rotation direction instruction image GD may be superimposed on the backward image P in such a simple manner that the location of the image GD is independent of the displacement "d". Alternatively, the rotation direction instruction image GD may be superimposed on the backward image P so that the size of the image GD is independent of the magnitude of the rotation angle of the steering wheel. Alternatively, the rotation direction instruction image GD may not be superimposed on the backward image P, and only the rotation direction instruction image GD my be displayed.

In the above-described parking aid system 1, the controller 40 superimposes the first inclination image GA1 on the backward image P so that the location of the image GA1 on the backward image P corresponds to the displacement "d". However, the display of the first inclination image GA1 is not limited to this example. For example, the first inclination image GA1 may be superimposed on the backward image P in such a simple manner that the location of the first inclination image GA1 is independent of the displacement "d". Alternatively, the first inclination image GA1 may not be superimposed on the backward image P, and only the first inclination image GA1 may be displayed. Alternatively, the first inclination image GA1 may not be displayed.

In the above-described parking aid system 1, the rotation direction instruction image GD and the first inclination image GA1 are displayed on the display device 30, and thereby, the first inclination angle CA1 and the displacement "d" are notified. The display device 30 is attached to an appropriate part in the vehicle compartment. Alternatively, a display device of a navigation apparatus mounted to a vehicle may be employed as the display device 30. Alternatively, the display device 30 may be arranged in a room mirror in the vehicle compartment, or may be arranged in instrument panels or a indicator in the vehicle compartment. Alternatively, the display device 30 may provide display at a remote place that a driver is easy to see.

A way of notifying the first inclination angle CA1 and the displacement "d" is not limited to displaying an image. For example, the parking aid system 1 may notify the first inclination angle CA1 and the displacement "d" by controlling light on-off of multiple light-emitting elements LED 11 to LED 15 and LED 21 to LED 25. A configuration employing the light-emitting elements will be described in detail.

Figure 9:
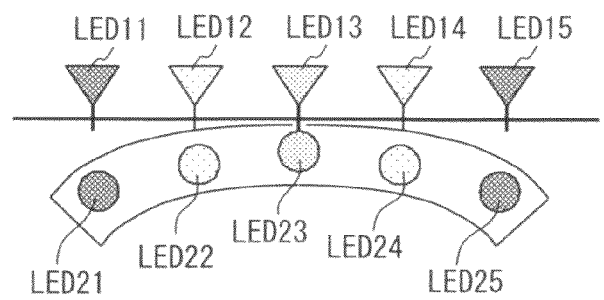
FIG. 9 is a diagram illustrating a modification example.

As shown in FIG. 9 (which corresponds to FIGS. 4A to 4D), the light-emitting elements LED 11 to LED 15 are arranged in a predetermined geometry to indicate the displacement "d". The light-emitting elements LED 21 to LED 25 are arranged in a predetermined geometry to indicate the first inclination angle CA1.

The light one-off operation of the light-emitting elements LED 11 to LED 15 may be controlled in, for example, the following way. As the magnitude of the displacement "d" is larger, the light-emitting element (e.g., LED 11, LED 15) located closer to an end of the light-emitting elements is turned on. As the magnitude of the displacement "d" is smaller, the light-emitting element (e.g., LED 13) located closer to a center of the light-emitting elements is turned on. When the displacement "d" is positive, the light-emitting element LED 14, LED 15 located on a right side of the center (i.e., LED 13) of the light-emitting elements is turned on. When the displacement "d" is negative, the light-emitting element LED 11, LED 12 located on a left side of the center (i.e., LED 13) of the light-emitting elements is turned on. According this configuration, it is possible to notify the displacement "d" of the vehicle with respect to the parking space boundary in the width direction by using light-emitting elements, i.e., by employing a simple configuration.

In a manner similar to the above, the light one-off operation of the light-emitting elements LED 21 to LED 25 may be controlled in the following way. As the magnitude of the first inclination angle CA1 is larger, the light-emitting element (e.g., LED 21, LED 25) located closer to an end of the light-emitting elements is turned on. As the magnitude of the first inclination angle CA1 is smaller, the light-emitting element (e.g., LED 23) located closer to a center of the light-emitting elements is turned off. When the first inclination angle CA1 is positive, the light-emitting element LED 24, LED 25 located on a right side of the center (i.e., LED 23) of the light-emitting elements is turned on. When the first inclination angle CA1 is negative, the light-emitting element LED 21, LED22 located on a left side of the center (i.e., LED 23) of the light-emitting elements is turned on. According to this configuration, it it possible to notify the first inclination angle CA1 by using the light-emitting elements, i.e., by employing a simple configuration. The light-emitting elements LED 11 to LED 25 can act as a notifier.

Figure 10:
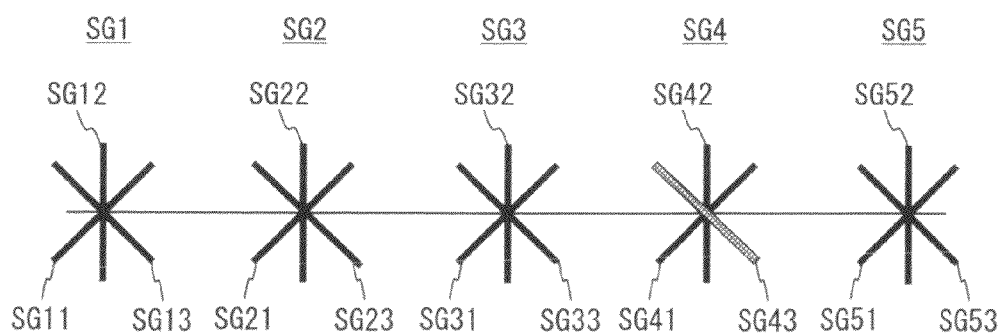
FIG. 10 is a diagram illustrating another modification example.

Furthermore, a way of notifying the displacement and the first inclination angle is not limited to the use of the above light-emitting elements. For example, the parking aid system 1 may notify the first inclination angle CA1 and the displacement "d" by controlling light on-off of multiple segments (i.e., segment display), as shown in FIG. 10 (which corresponds to FIG. 4). The multiple segments are arranged in a predetermined geometry to indicate the displacement "d". Each of the multiple segments has multiple parts, which are arranged in a predetermined geometry to indicate the first inclination angle CA1.

More specifically, as shown in FIG. 10, the segments SG1 to SG5 are respectively arranged at predetermined places that correspond to values of the displacement "d". The multiple parts SG11 to SG53 in the segments SG1 to SG5 are selectively turned on according to the first inclination angle CA1.

Explanation on the on-off control relevant to the displacement "d" is given below. When the displacement "d" is positive, the parking aid system 1 turns on the segment SG4 or SG5 (more specifically, one of SG41 to SG43, or one of SG51 to SG53), which is located on a right side of the center one SG3 of the segments. In this case, as the magnitude of the displacement "d" is larger, the segment located closer to a right end (SG5) of the segments is turned on. When the displacement "d" is negative, the parking aid system 1 turns on the segment SG1 or SG2 (more specifically, one of SG11 to SG13, or one of SG21 to SG23), which is located on a left side of the center one SG3 of the segments. In this case, as the magnitude of the displacement "d" is smaller, the segment located closer to a left end (SG1) of the segments. When the magnitude of the displacement "d" is small, the segment SG3 (more specifically, SG31 to SG33) located at the center of the segments is turned on.

Explanation on the on-off control relevant to the first inclination angle CA1 is given below. When the first inclination angle CA1 is positive and has a magnitude exceeding a predetermined threshold, the controller 40 turns on one of the parts SG11, SG21, SG31, SG41 and SG51, each of which is inclined in a clockwise direction. When the first inclination angle CA1 is negative and has a magnitude exceeding the predetermined threshold, the controller 40 turns on one of the parts SG13, SG23, SG33, SG43 and SG53, each of which is inclined in an anticlockwise direction. When the magnitude of the first inclination angle CA1 is less than or equal to the predetermined threshold, the controller 40 turns on one of parts SG12, SG22, SG32, SG42 and SG52, each of which extends in a horizontal direction. According to this configuration, it is possible to notify the first inclination angle CA1 of the vehicle with respect to the parking space boundary and the displacement "d" of the vehicle with respect to the parking space boundary in the width direction by using the segments, i.e., by employing a simple configuration. The segments can act as a notifier.

In the above-described parking aid system 1, the controller 40 calculates the first inclination angle CA1, which is an inclination angle of the vehicle with respect to the parking space boundary. Further, the controller 40 creates and displays the first inclination image GA1 and the rotation direction instruction image GD based on the calculated first inclination angle CA1. The parking aid system 1 is, however, not limited to this configuration. For example, as shown in exemplary display illustrated in FIGS. 11A to 11C (which correspond to FIGS. 4A to 4D), the parking aid system 1 may calculates a second inclination angle CA2, which is an inclination angle of the vehicle with respect to a parking prediction line. Then, based on the second inclination angle CA2, the parking aid system 1 may create and display a second inclination image CA2 and a rotation direction instruction image GD2. In the following, a configuration for the second inclination image CA2 and the rotation direction instruction image GD2 will be described in more detail.

The parking aid system 1 includes a steering sensor (not shown) for detecting steering angle of the vehicle. The controller 40 calculates the parking prediction lines L1 and L2, which are created so as to match lateral sides of the vehicle when the vehicle C is parked into the parking space boundary with maintenance of the steering angle at a value detected by the steering sensor. It should be noted that since it is possible to employ a known way of calculating the parking prediction line (i.e., movement prediction line), the detailed explanation on the way of calculating the parking prediction line is omitted here.

The controller 40 selects one of the parking prediction lines L1 and L2, and further selects one of the borderlines "I1" and "I", which are recognized based on the backward image P. As the second inclination angle, the controller 40 calculates an angle between the selected one of the parking prediction lines and the selected one of the borderlines. In the examples shown in FIGS. 11A to 11C, the controller 40 selects the parking prediction lines L2 from the lines L1 and L2, and selects the borderline "I2" from the lines "I1" and "I2", and calculates an angle between the parking prediction lines L2 and the borderline "I2" as the second inclination angle CA2.

Then, based on the second inclination angle CA2, the controller 40 creates the second inclination image GA2, which is rotated around an end point thereof by a rotation degree so that the rotation degree indicates the second inclination angle CA2. In addition, the controller 40 creates the rotation direction instruction image GD2 indicative of which rotation direction of the steering wheel decreases the second inclination angle CA2. Since the controller 40 creates the second inclination image GA2 and the rotation direction instruction image GD2 in a manner similar to that of creating the first inclination image GA1 and the rotation direction instruction image GD, the more detailed explanation on it is omitted here. The controller 40 causes the display device to display the borderlines "I1" and "I2", the parking prediction line "L1" and "L2", the second inclination image GA2, and the rotation direction instruction image GD2.

Figure 11A:
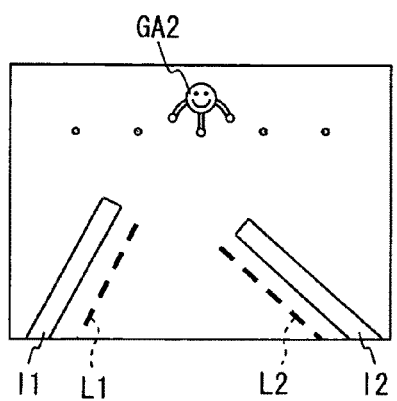
FIGS. 11A to 11C are diagrams each illustrating exemplary display of a parking prediction line, parking space borderlines, a rotation direction instruction image, and a second inclination angle image.

When the second inclination angle CA2 is calculated to be zero as shown in FIG. 11A for example, in other words, when the parking prediction lines "L1" and "L2" are respectively parallel to the borderlines "I1" and "I2", the controller 40 creates "a balance toy image having a horizontally-balanced position" as the second inclination image GA2. The controller 40 causes the display device 30 to display the second inclination image GA2.

Figure 11B:
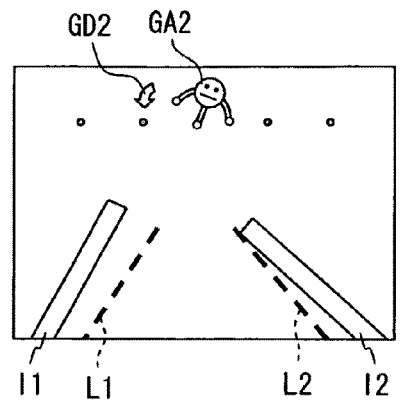
Figure 11C:
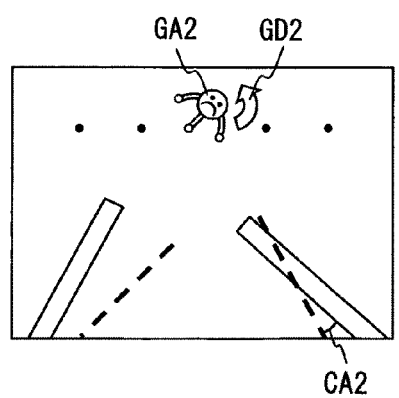

When the magnitude of the second inclination angle CA2 is small as shown in FIG. 11B for example, in other words, when the parking prediction lines "L1", "L2" are respectively inclined with respect to the borderlines "I1", "I2" to a medium degree, the controller 40 may creates "a balance toy image inclined clockwise to a medium degree" as the second inclination image GA2. Further, the controller 40 creates "a medium size arrow representative of an anticlockwise direction" as the rotation direction instruction image GD2. The controller 40 causes the display device 30 to display the second inclination image GA2 and the rotation direction instruction image GD2.

When the magnitude of the second inclination angle CA2 is large as shown in FIG. 11B for example, in other words, when the parking prediction lines "L1", "L2" are respectively inclined with respect to the borderlines "I1", "I2" to a large degree, the controller 40 creates "a balance toy image inclined clockwise to a large degree" as the second inclination image GA2. Further, the controller 40 creates "a large size arrow representative of an anticlockwise direction" as the rotation direction instruction image GD2. The controller 40 causes the display device 30 to display the second inclination image GA2 and the rotation direction instruction image GD2.

Through the above manners, the parking aid system 1 can notify the second inclination angle of the vehicle with respect to the parking space boundary. Since the parking aid system 1 notifies the second inclination angle CA2 by displaying the second inclination image GA2, the driver of the vehicle is possible to recognize the second inclination angle at a glance. Moreover, since the parking aid system 1 indicates the second inclination angle CA2 by using the rotation degree of the second inclination image, the driver of the vehicle is possible to easily recognize the second inclination angle CA2.

The above parking aid system 1 may change color of the parking prediction lines or may blink on and off the parking prediction lines depending on the magnitude of the second inclination angle, in order to provide visual information that the driver of the vehicle can recognize at a glance.

According to a first aspect of the present disclosure, a parking aid system is provided to aid in parking a vehicle into a parking space boundary defining a parking space. The parking aid includes a parking space borderline recognition section, a displacement calculation section and a notifier. The parking space borderline recognition section is configured to recognize two borderlines of the parking space based on a captured image, which is captured by an imaging device mounted to the vehicle. In the above, the two borderlines are respectively two parts of the parking space boundary opposite to each other in a width direction of the parking space. The displacement calculation section is configured to calculate displacement of the vehicle in the width direction with respect to the two borderlines based on positions of the two borderlines in the captured image and an imaging range of the imaging device, the imaging range being determined by reference to the vehicle. The notifier is configured to notify the displacement calculated by the displacement calculation section.

According to the above parking aid system, the two borderlines constituting the parking space boundary are recognized based on the captured image, which is captured by the imaging device. Further, the displacement of the vehicle with respect to the parking space boundary in the width direction is calculated based on the positions of the two borderlines on the captured image and the imaging range of the imaging device by reference to the vehicle. Further, the calculated displacement in the width direction is notified. Through the above manners, it is possible to notify the displacement of the vehicle with respect to the parking space boundary in the width direction of the parking space.

The above parking aid system may be configured such that the displacement calculation section calculates the displacement as a distance between a center line of the parking space and a center point of the vehicle. The center line of the parking space is a line located at a same distance from the two borderlines. The center point of the vehicle is a point located at a center of the vehicle in a front-rear direction of the vehicle and located on a vehicle center line, which is at a same distance from both lateral sides of the vehicle. According to this configuration, the distance between the center line of the parking space and the center point of the vehicle is calculated as the displacement of the vehicle with respect to the parking space boundary in the width direction. It should be noted that the center point of the vehicle remains unchanged when the inclination of the vehicle is changed. Therefore, even if the vehicle is parked while being inclined with respect to the parking space boundary, the parking aid system can calculate the displacement of the vehicle with respect to the parking space boundary in the width direction.

In the above parking aid system, the imaging device may be one or more imaging devices. In other words, the number of imaging devices is arbitrary. Thus, for example, three imaging devices may be employed, the three including one backward imaging device for imaging an area backward of the vehicle and two lateral imaging devices for respectively imaging areas leftward and rightward of the vehicle. Alternatively, a different set of three imaging devices may be employed, the three including one frontward imaging device for imaging an area frontward of the vehicle and two lateral imaging devices for imaging respectively areas leftward and rightward of the vehicle. Alternatively, four imaging devices may be employed, the four including one backward imaging device for imaging an area backward of the vehicle, one frontward imaging device for imaging an area frontward of the vehicle, and two lateral imaging devices for respectively imaging areas leftward and rightward of the vehicle. Alternatively, only one backward imaging device for imaging an area backward of the vehicle may be employed as the imaging device.

In this relation, if a movement direction imaging device, which images an area frontward or backward of the vehicle, is employed as the imaging device, the following situation may arise. Just before the completion of parking, the two borderlines constituting the parking space boundary may be located outside of the imaging range of the movement direction imaging device and the two borderlines cannot be imaged on the captured image, and as a result, the calculation of the positions of the two borderlines on the capture image may become impossible. When the calculation of the positions of the two borderlines on the capture image becomes impossible, the calculation of the displacement of the vehicle with respect to the parking space boundary in the width direction may become impossible, and the notification of the displacement may become impossible.

In view of the foregoing, the parking aid system may be configured in the following way. The imaging device may be a component of the parking aid system and may be one movement direction imaging device, which images an area frontward or backward of the vehicle. The parking space borderline recognition section may further recognize an auxiliary line in addition to the two borderlines based on the captured image, which is captured by the single movement direction imaging device. In the above, the auxiliary line is a line located on such a place that the auxiliary line is located more distant from a vehicle approach side of the parking space than the two borderlines are from the vehicle approach side. The parking space borderline recognition section may acquire a positional relationship between the auxiliary line and the two borderlines in recognizing the two borderlines and the auxiliary line, so that the positional relationship is prospectively acquired. The displacement calculation section may calculate the displacement by using the center point of the vehicle and the auxiliary line when the parking space borderline recognition section becomes unable to recognize the two borderlines.

According to the above configuration, in addition to the two borderlines, the auxiliary line, which is located more distant from a vehicle approach side of the parking space than the two borderlines are from the vehicle approach side, is recognized. The positional relationship between the auxiliary line and the two borderlines is prospectively acquired when the auxiliary line and the two borderlines are being recognized. When the recognition of the two borderlines becomes impossible, the displacement is calculated with use of the center point of the vehicle and the auxiliary line. Through the above manners, the displacement of the vehicle with respect to the parking space boundary in the width direction can be calculated based on the captured image captured by the one movement direction imaging device. Furthermore, since the one imaging device suffices in the above configuration, it is possible to simplify the parking aid system, and as a result, it becomes possible to reduce cost.

The above parking aid system may further include an inclination angle calculation section that is configured to calculate an inclination angle of the vehicle with respect to the parking space boundary based on the two borderlines recognized by the parking space borderline recognition section. In this configuration, it is possible to calculate the inclination angle of the vehicle with respect to the parking space boundary.

The above parking aid system may further include a rotation direction instruction image creation section that is configured to create a rotation direction instruction image indicative of a rotation direction of a steering wheel of the vehicle. The rotation direction instruction image informs that operation of the steering wheel in the indicated rotation direction decreases the inclination angle calculated by the inclination angle calculation section. Further, the notifier may include a display device configured to perform display operation and a display control section configured to control the display operation of the display device, the display operation including display of the rotation direction instruction image.

According to the above configuration, the parking aid system creates the rotation direction instruction image indicative of which rotation direction of the steering decreases magnitude of the inclination angle calculated by the inclination angle calculation section, in other words, indicative of which rotation direction of the steering wheel makes the vehicle parallel to the parking space boundary. The created rotation direction instruction image is displayed by the display device. Through the above manners, the parking aid system can instruct a driver to operate the steering wheel in the indicated rotation direction by using the rotation angle instruction image. As a result, the parking aid system enables a driver to operate the steering wheel as indicated by the rotation angle instruction image, and enables the driver to park the vehicle parallel to the parking space boundary. Therefore, the parking aid system can provide preventive measures against a retry of the parking. It should be noted that since the rotation direction of the steering wheel is instructed with an image, a vehicle driver can understand the instructed rotation direction at a glance.

The above parking aid system may be configured such that: the instruction image creation section creates the rotation direction instruction image so that size of the created rotation direction instruction image corresponds to a magnitude of rotation angle of the steering wheel, the magnitude causing the inclination angle to be zero. According to this configuration, it is possible to instruct the magnitude of the rotation angle of the steering wheel by using the size of the rotation direction instruction image. Thus, the driver of the vehicle can operate the steering wheel by following the instruction provided by the rotation direction instruction image, and thereby can park the vehicle in an orientation parallel to the parking space boundary. It is therefore possible to more efficiently prevent the retry of the parking.

The above parking aid system may be configured such that: the display control section causes the display device to display thereon the captured image, which is captured by the imaging device; and the display control section further causes the display device to superimpose the rotation direction instruction image on the captured image. According to this configuration, since the rotation direction instruction image is superimposed on the captured image, the driver of the vehicle can recognize the instruction of the rotation direction of the steering wheel in a more intuitive manner. In the above configuration, the rotation direction instruction image superimposed on the captured image may have the size that corresponds to a magnitude of rotation angle of the steering wheel, the magnitude causing the inclination angle to be zero, as described above. In this case, the driver of the vehicle can recognize not only the instruction of the magnitude of the rotation angle of the steering wheel but also the instruction of the rotation direction of the steering wheel, in a more intuitive manner.

The above parking aid system may be configured such that: the display control section causes the display device to display thereon the captured image, which is captured by the imaging device; and the display control section further causes the display device to superimpose the rotation direction instruction image on the captured image so that location of the rotation direction instruction image on the captured image corresponds to the displacement calculated by the displacement calculation section. According to this configuration, the location of the rotation direction instruction image on the captured image can be a notification of the displacement of the vehicle with respect to the parking space boarder in the width direction. Moreover, since the rotation direction instruction image is superimposed on the captured image at the location corresponding to the displacement, the driver can intuitively recognize the displacement.

The above parking aid system may further include an inclination image creation section that is configured to create an inclination image which is indicative of the inclination angle calculated by the inclination angle calculation section and which is rotated around an end point of the inclination image by a rotation degree that corresponds to the inclination angle. Further, the notifier may include a display device configured to perform display operation, and a display control section configured to control the display operation of the display device, the display operation including display of the inclination image. According to the above configuration, by using the inclination image, it is possible to notify the inclination angle of the vehicle with respect to the parking space boundary. Further, since the inclination angle image indicative of the inclination angle is displayed, the driver of the vehicle can recognize, at a glance, the inclination angle of the vehicle with respect to the parking space boundary. Furthermore, since the degree of rotation around the end point indicates the inclination angle, the driver of the vehicle can easily recognize the inclination angle of the vehicle with respect to the parking space boundary.

The above parking aid system may be configured such that: the display control section causes the display device to display thereon the captured image, which is captured by the imaging device; and the display control section further causes the display device to superimpose the inclination image on the captured image. According to this configuration, since the inclination angle image is superimposed on the captured image, the driver of the vehicle can recognize the inclination angle in a more intuitive manner.

Alternatively, the above parking aid system may be configured such that: the display control section causes the display device to display thereon the captured image, which is captured by the imaging device; and the display control section causes the display device to superimpose the inclination image on the captured image so that location of the inclination image on the captured image corresponds to magnitude of the displacement calculated by the displacement calculation section. According to this configuration, by using the location of the inclination image on the captured image, it is possible to notify the displacement of the vehicle with respect to the parking space boarder in the width direction. Moreover, since the inclination image is superimposed on the captured image at the location corresponding to the displacement, the driver can intuitively recognize the displacement.

It should be noted that a way for notifying the displacement is not limited to the image display. For example, in any one of the above-described configuration, the notifier may include multiple segments (segment display) each having multiple parts. The multiple segments may be arranged in a predetermined geometry to indicate the displacement calculated by the displacement calculation section. The multiple parts of each segment may be arranged in a predetermined geometry to indicate the inclination angle calculated by the inclination angle calculation section. The notifier may be configured such that one part of one segment lights up when the one part corresponds to a present value of the inclination angle and when the one segment corresponds to a present value of the displacement. According the above configuration, by using a simply configuration with segments, it is possible to notify the displacement of the vehicle with respect to the parking space boundary in the width direction and the inclination angle of the vehicle with respect to the parking space boundary.

Alternatively, the notifier may include multiple light-emitting elements. The multiple light-emitting elements are arranged in a predetermined geometry to indicate to the inclination angle calculated by the inclination angle calculation section. According to this configuration, it is possible to notify the inclination angle of the vehicle with respect to the parking space boundary by using a simple configuration with light-emitting elements.

Alternatively, the notifier may include multiple light-emitting elements arranged in a predetermined geometry to indicate the displacement calculated by the displacement calculation section. According to this configuration, it is possible to notify the displacement of the vehicle with respect to the parking space boundary in the width direction by using a simple configuration with light-emitting elements.

The above parking aid system may further include an illustration creation section. The illustration creation section creates an illustration indicative of a result of the parking of the vehicle with respect to the parking space boundary based on the displacement calculated by the displacement calculation section and the inclination angle calculated by the inclination angle calculation section. The display device may display thereon the illustration created by the illustration creation section to indicate the result of the parking. According to this configuration, the parking aid system uses the illustration displayed by the display device to enable the driver of the vehicle to recognize the result of the parking of the vehicle with respect to the barking space boundary.

Alternatively, the parking aid system may include: a parking result evaluation section that is configured to evaluate a result of the parking of the vehicle with respect to the parking space boundary thereby to provide an evaluation result, based on the displacement calculated by the displacement calculation section and the inclination angle calculated by the inclination angle calculation section; and an illustration creation section that is configured to create an illustration indicative of the evaluation result provided by the parking result evaluation section. The display control section may cause the display device to display thereon the illustration created by the illustration creation section to indicate the evaluation result. According to this configuration, the parking aid system uses the illustration displayed on the display device to enable the driver of the vehicle to recognize the objective evaluation result of the parking.

Alternatively, the parking aid system may include: a parking result scoring section that is configured to score a result of the parking of the vehicle with respect to the parking space boundary thereby to provide a scoring result, based on the displacement calculated by the displacement calculation section and the inclination angle calculated by the inclination angle calculation section; and an illustration creation section that is configured to create an illustration indicative of the scoring result provided by the parking result scoring section. The display control section may cause the display device to display thereon the illustration created by the illustration creation section to indicate the scoring result. According to this configuration, the parking aid system uses the illustration displayed on the display device to enable the driver of the vehicle to recognize the objective scoring result of the parking.

According to the above configurations, the driver of the vehicle can recognize his or her skill of parking the vehicle into the parking space boundary through the displayed illustration indicative of the result of the parking, the evaluation result or the scoring result. It should be noted that a combination use of the result parking, the evaluation result and the scoring result is possible.

The above parking aid system may include a storage section that is configured to accumulatively store therein the scoring result provided by the parking result scoring section. The display control section may cause the display device to display thereon a graph showing transition of the scoring results stored in the storage section. According to this configuration, the parking aid system enables the driver of the vehicle to recognize the transition of the scoring results from past to present. As a result, the parking aid system can encourage the driver to improve his or her skill of parking a vehicle into a parking space boundary.

According to a second aspect of the present disclosure, a parking aid system is provided to aid in parking a vehicle into a parking space boundary defining a parking space. The parking aid system includes a parking space borderline recognition section, an inclination angle calculation section, a rotation direction instruction image creation section, a display device and a display control section. The parking space borderline recognition section is configured to recognize two borderlines based on a captured image, which is captured by an imaging device mounted to the vehicle. In the above, the two borderlines are respectively two parts of the parking space boundary opposite to each other in a width direction of the parking space. The inclination angle calculation section is configured to calculate an inclination angle of the vehicle with respect to the parking space boundary based on the two borderlines recognized by the parking space borderline recognition section. The rotation direction instruction image creation section is configured to create a rotation direction instruction image indicative of which rotation direction of a steering wheel of the vehicle decreases magnitude of the inclination angle calculated by the inclination angle calculation section. The display device is configured to perform display operation. The display control section is configured to control of the display operation of the display device, the display operation including display of the rotation direction instruction image by the display device.

According to the above parking aid system, the rotation direction instruction image is created so as to indicate which rotation direction of the steering wheel decreases magnitude of the inclination angle calculated by the inclination angle calculation section, in other words, so as to indicate which rotation direction of the steering wheel makes the vehicle parallel to the parking space boundary. The created rotation direction instruction image is displayed by the display device. Thus, the parking aid system can instruct a driver to operate the steering wheel in the indicated the rotation direction by using the rotation angle instruction image. As a result, the parking aid system enables a driver to operate the steering wheel as indicated by the rotation angle instruction image, and enables the driver to park the vehicle in an orientation parallel to the parking space boundary. Therefore, the parking aid system provides preventive measures against parking retry. It should be noted that since the rotation direction of the steering wheel is instructed with an image, a vehicle driver can understand the instructed rotation direction at a glance.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above may be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units may be included in a software program, which is contained in a computer-readable storage media or is installed in a computer via a communications network.

What is claimed is:

1. A parking aid system for aiding in parking a vehicle into a parking space defined by a parking space boundary, the parking aid system comprising:
   a parking space borderline recognition section that is configured to recognize two borderlines of the parking space based on a captured image, which is captured by an imaging device mounted to the vehicle, the two borderlines respectively being two parts of the parking space boundary and being opposite to each other in a width direction of the parking space;
   a displacement calculation section that is configured to calculate displacement of the vehicle in the width direction with respect to the two borderlines based on positions of the two borderlines in the captured image and an imaging range of the imaging device, the imaging range being determined by reference to the vehicle; and a notifier that is configured to notify the displacement calculated by the displacement calculation section, wherein:
the displacement calculation section calculates the displacement as a distance between a center line of the parking space and a center point of the vehicle;
the center line of the parking space is a line located at a same distance from the two borderlines; and
the center point of the vehicle is a point located at a center of the vehicle in a front-back direction of the vehicle and located on a vehicle center line, which is at a same distance from both lateral sides of the vehicle.

2. A parking aid system for aiding in parking a vehicle into a parking space defined by a parking space boundary, the parking aid system comprising:
a parking space borderline recognition section that is configured to recognize two borderlines of the parking space based on a captured image, which is captured by an imaging device mounted to the vehicle, the two borderlines respectively being two parts of the parking space boundary and being opposite to each other in a width direction of the parking space;
a displacement calculation section that is configured to calculate displacement of the vehicle in the width direction with respect to the two borderlines based on positions of the two borderlines in the captured image and an imaging range of the imaging device, the imaging range being determined by reference to the vehicle; and
a notifier that is configured to notify the displacement calculated by the displacement calculation section;
wherein:
the imaging device is a component of the parking aid system and is one movement direction imaging device, which images an area frontward or backward of the vehicle;
the parking space borderline recognition section further recognizes an auxiliary line in addition to the two borderlines based on the captured image captured by the one movement direction imaging device;
the auxiliary line being located on such a place that the auxiliary line is located more distant from a vehicle approach side of the parking space than the two borderlines are from the vehicle approach side;
the parking space borderline recognition section acquires a positional relationship between the auxiliary line and the two borderlines in recognizing the two borderlines and the auxiliary line, so that the positional relationship is prospectively acquired; and
when the parking space borderline recognition section becomes unable to recognize the two borderlines, the displacement calculation section calculates the displacement by using the center point of the vehicle and the auxiliary line.

3. A parking aid system for aiding in parking a vehicle into a parking space defined by a parking space boundary, the parking aid system comprising:
a parking space borderline recognition section that is configured to recognize two borderlines of the parking space based on a captured image, which is captured by an imaging device mounted to the vehicle, the two borderlines respectively being two parts of the parking space boundary and being opposite to each other in a width direction of the parking space;
a displacement calculation section that is configured to calculate displacement of the vehicle in the width direction with respect to the two borderlines based on positions of the two borderlines in the captured image and an imaging range of the imaging device, the imaging range being determined by reference to the vehicle;
a notifier that is configured to notify the displacement calculated by the displacement calculation section; and
an inclination angle calculation section that is configured to calculate an inclination angle of the vehicle with respect to the parking space boundary based on the two borderlines recognized by the parking space borderline recognition section.

4. The parking aid system according to claim 3, further comprising:
a rotation direction instruction image creation section that is configured to create a rotation direction instruction image indicative of which rotation direction of a steering wheel of the vehicle decreases magnitude of the inclination angle calculated by the inclination angle calculation section,
wherein the notifier includes
a display device configured to perform display operation and
a display control section configured to control the display operation of the display device, the display operation including display of the rotation direction instruction image.

5. The parking aid system according to claim 4, wherein:
the instruction image creation section creates the rotation direction instruction image so that size of the created rotation direction instruction image corresponds to a magnitude of rotation angle of the steering wheel, the magnitude causing the inclination angle to be zero.

6. The parking aid system according to claim 4, wherein:
the display control section causes the display device to display thereon the captured image, which is captured by the imaging device; and
the display control section further causes the display device to superimpose the rotation direction instruction image on the captured image.

7. The parking aid system according to claim 4, wherein:
the display control section causes the display device to display thereon the captured image, which is captured by the imaging device; and
the display control section further causes the display device to superimpose the rotation direction instruction image on the captured image so that location of the rotation direction instruction image on the captured image corresponds to the displacement calculated by the displacement calculation section.

8. The parking aid system according to claim 3, further comprising:
an inclination image creation section that is configured to create a inclination image which is indicative of the inclination angle calculated by the inclination angle calculation section and which is rotated around an end point of the inclination image by a rotation degree that corresponds to the inclination angle,
wherein the notifier includes
a display device configured to perform display operation and
a display control section configured to control the display operation of the display device, the display operation including display of the inclination image.

9. The parking aid system according to claim 8, wherein:
the display control section causes the display device to display thereon the captured image, which is captured by the imaging device; and the display control section further causes the display device to superimpose the inclination image on the captured image.

10. The parking aid system according to claim 8, wherein:
the display control section causes the display device to display thereon the captured image, which is captured by the imaging device; and
the display control section causes the display device to superimpose the inclination image on the captured image so that location of the inclination image on the captured image corresponds to a magnitude of the displacement calculated by the displacement calculation section.

11. The parking aid system according to claim 3, wherein the notifier includes a plurality of segments each having a plurality of parts;
the plurality of segments is arranged in a predetermined geometry to indicate the displacement calculated by the displacement calculation section;
the plurality of parts of each segment is arranged in a predetermined geometry to indicate the inclination angle calculated by the inclination angle calculation section; and
the notifier is configured such that one part of one segment lights up when the one part corresponds to a present value of the inclination angle and when the one segment corresponds to a present value of the displacement.

12. The parking aid system according to claim 3, wherein:
the notifier includes a plurality of light-emitting elements; and
the plurality of light-emitting elements is arranged in a predetermined geometry to indicate the inclination angle calculated by the inclination angle calculation section.

13. The parking aid system according to claim 3, further comprising:
an illustration creation section that is configured to create an illustration indicative of a result of the parking of the vehicle with respect to the parking space boundary, based on the displacement calculated by the displacement calculation section and the inclination angle calculated by the inclination angle calculation section,
wherein the notifier includes a display device,
wherein the display device displays thereon the illustration created by the illustration creation section to indicate the result of the parking.

14. The parking aid system according to claim 3, further comprising:
a parking result evaluation section that is configured to evaluate a result of the parking of the vehicle with respect to the parking space boundary thereby to provide an evaluation result, based on the displacement calculated by the displacement calculation section and the inclination angle calculated by the inclination angle calculation section; and
an illustration creation section that is configured to create an illustration indicative of the evaluation result provided by the parking result evaluation section,
wherein the notifier includes a display device and a display control section configured to control the display device,
wherein the display control section causes the display device to display thereon the illustration created by the illustration creation section to indicate the evaluation result.

15. The parking aid system according to claim 3, further comprising:
a parking result scoring section that is configured to score a result of the parking of the vehicle with respect to the parking space boundary thereby to provide a scoring result, based on the displacement calculated by the displacement calculation section and the inclination angle calculated by the inclination angle calculation section; and
an illustration creation section that is configured to create an illustration indicative of the scoring result provided by the parking result scoring section,
wherein the notifier includes a display device and a display control section configured to control the display device,
wherein the display control section causes the display device to display thereon the illustration created by the illustration creation section to indicate the scoring result.

16. The parking aid system according to claim 15, further comprising;
a storage section that is configured to accumulatively store therein the scoring result provided by the parking result scoring section,
wherein the display control section causes the display device to display thereon a graph showing transition of the scoring result, which is stored in the storage section.

17. A parking aid system for aiding in parking a vehicle into a parking space defined by a parking space boundary, the parking aid system comprising:
a parking space borderline recognition section that is configured to recognize two borderlines based on a captured image, which is captured by an imaging device mounted to the vehicle, the two borderlines respectively being two parts of the parking space boundary and being opposite to each other in a width direction of the parking space;
an inclination angle calculation section that is configured to calculate a inclination angle of the vehicle with respect to the parking space boundary based on the two borderlines recognized by the parking space borderline recognition section;
a rotation direction instruction image creation section that is configured to create a rotation direction instruction image indicative of which rotation direction of a steering wheel decreases magnitude of the inclination angle calculated by the inclination angle calculation section;
a display device that is configured to perform display operation; and
a display control section that is configured to control of the display operation of the display device, the display operation including display of the rotation direction instruction image by the display device.

* * * * *